(12) United States Patent  
Bai

(10) Patent No.: US 9,204,488 B2
(45) Date of Patent: Dec. 1, 2015

(54) WIRELESS COMMUNICATION TRANSMITTING AND RECEIVING SYSTEM

(75) Inventor: Jian Bai, Hui Zhou (CN)

(73) Assignee: HUIZHOU TCL MOBILE COMMUNICATION CO., LTD, Hui Zhou, Guang Dong (CN)

( * ) Notice: Subject to any disclaimer, the term of this patent is extended or adjusted under 35 U.S.C. 154(b) by 91 days.

(21) Appl. No.: 14/125,880

(22) PCT Filed: May 28, 2012

(86) PCT No.: PCT/CN2012/076154
§ 371 (c)(1),
(2), (4) Date: Dec. 12, 2013

(87) PCT Pub. No.: WO2013/082924
PCT Pub. Date: Jun. 13, 2013

(65) Prior Publication Data
US 2014/0133372 A1 May 15, 2014

(30) Foreign Application Priority Data

Dec. 7, 2011 (CN) .......................... 2011 1 0404205

(51) Int. Cl.
H04B 1/00 (2006.01)
H04B 1/16 (2006.01)
H04B 1/04 (2006.01)
H04B 1/18 (2006.01)
(Continued)

(52) U.S. Cl.
CPC ............... *H04W 88/00* (2013.01); *H04B 1/006* (2013.01); *H04B 1/0067* (2013.01); *H04B 1/04* (2013.01); *H04B 1/16* (2013.01); *H04B 1/18* (2013.01); *H04B 1/525* (2013.01); *Y02B 60/50* (2013.01)

(58) Field of Classification Search
None
See application file for complete search history.

(56) References Cited

U.S. PATENT DOCUMENTS 7,149,483 B1 * 12/2006 Reinisch et al. ............... 455/101
2001/0035123 A1 * 11/2001 Lee et al. .......................... 117/3
(Continued)

FOREIGN PATENT DOCUMENTS

CN 1647401 A1 1/2004
CN 1476680 A1 2/2004
(Continued)

OTHER PUBLICATIONS

Office Action dated Dec. 25, 2013 in CN application 201110404205.2.

(Continued)

Primary Examiner — Ashley Shivers
(74) Attorney, Agent, or Firm — Shimokaji IP

(57) ABSTRACT

A wireless communication transmitting and receiving system may comprise a wireless transmitting and receiving unit, a receiving processing circuit, a transmitting processing circuit, and a receiving aerial and a transmitting aerial. Both the receiving processing circuit and the transmitting processing circuit may be connected to the wireless transmitting and receiving unit, and the receiving aerial and the transmitting aerial may be connected to the receiving processing circuit and the transmitting processing circuit. The present invention may use a dual-aerial structure in which a transmitting channel is separated from a receiving channel and the two channels use respective aerials for communication; the separate aerials may provide an isolation of approximately 10 dB, thus lowering the in-band noise receiving requirement for the transmitting channel.

18 Claims, 3 Drawing Sheets

(51) Int. Cl.
*H04W 88/00* (2009.01)
*H04B 1/525* (2015.01)

(56) References Cited

U.S. PATENT DOCUMENTS

| | | | |
|---|---|---|---|
| 2004/0018815 A1 | 1/2004 | Lin | |
| 2004/0071111 A1* | 4/2004 | Satoh et al. | 370/329 |
| 2004/0130388 A1* | 7/2004 | Block et al. | 327/558 |
| 2006/0223368 A1* | 10/2006 | Hayashi | 439/579 |
| 2007/0290804 A1* | 12/2007 | Komesu | 340/10.1 |
| 2009/0180403 A1* | 7/2009 | Tudosoiu | 370/278 |
| 2011/0234295 A1* | 9/2011 | Uejima et al. | 327/407 |
| 2013/0016633 A1* | 1/2013 | Lum et al. | 370/277 |

FOREIGN PATENT DOCUMENTS

| | | |
|---|---|---|
| CN | 102148622 A1 | 8/2011 |
| CN | 102185623 A1 | 9/2011 |
| CN | 102404879 A1 | 4/2012 |

OTHER PUBLICATIONS

Office Action dated Sep. 17, 2014 in CN application 20111040205.2.

* cited by examiner

WIRELESS COMMUNICATION TRANSMITTING AND RECEIVING SYSTEM

TECHNICAL FIELD

The present invention relates to the field of wireless communication, and in particular to a wireless communication transmitting and receiving system using a dual-aerial.

BACKGROUND

Existing 3G/4G FDD (Frequency Division Duplex) terminals use a full duplex design, and a transmitting channel and a receiving channel may operate simultaneously. In a conventional radio frequency (RF) architecture, a duplexer may be an essential device and may mainly function as follows: (1) it may converge and provide separation between the transmitting channel and the receiving channel, i.e. attenuating noise of a RF signal of the transmitting channel at a receiving frequency band in order for it not to interfere with a receiving signal.

Separation between the transmitting channel and the receiving channel may be provided so that the receiving channel is required to operate under a very weak condition (currently typically being −110 dBm). However, the transmitting channel may be a high power channel which can reach an intensity of 28 dBm. Due to nonlinearity of a RF system, there may be a very strong stray out-band under the condition of a 28 dBm major wave. The stray out-band may directly feed into the receiving terminal if not separated at the receiving frequency band, and the intensity may be higher than an intensity of received useful signals, thereby finally affecting receiving performances.

A typical RF structure of a FDD mobile terminal is shown in FIG. 1. Taking a WCDMA FDD terminal as an example, we may analyze the design of its receiving system as follows.

The typical receiving sensitivity of an existing WCDMA terminal may be −110 dBm.

The power of DPDCH (Dedicated Physical Data Channel) may be −120.3 dBm. A channel coding rate for WCDMA sensitivity test may be 12.2 kbps, and a coding gain may be 10×1 g (3.84 MHz/12.2) which may be equal to 25 dB.

A decoding threshold for QPSK modulation mode for WCDAMA may be 5.2 dB. A 2 dB margin may need to be reserved, and so an input signal-to-noise ratio (SNR) of a demodulation module may be required to be 7.2 dB.

Therefore, noise at an input terminal of the demodulation module may be lower than −120.3+25−7.2=−102.5 dBm/3.84 MHz=−168.343 dBm/Hz;

In view of the noise indicator of a receiver being typically 5 dB, the noise at the input terminal of the demodulation module may be lower than −173.343 dBm/Hz. And the thermal noise of the system KBT=−200+26.022=−173.977 dBm/Hz=−108.13 dBm/3.84 MHz;

$K$(Boltzmann constant)=1.38×10−20mJ/$K$,$B$=3.84 MHz (65.843 dB), $T$=290 K.

The output noise of an existing typical amplifier may be −160 dBm/Hz (output of wireless transceiver)+28 dB (typical amplification gain of amplifier at receiving frequency band)=−132 dBm/Hz=−66.16 dBm/3.84 MHz.

Therefore, a typical duplexer is required to provide at least isolation of 173.343−132 =41 dB. Due to this large provided isolation, the insertion loss (IL) of an existing duplexer is larger, and is very large especially under the condition of high frequency and when the transmitting frequency band and the receiving frequency band are near. For example, the insertion loss of a duplexer used in WCDMA BC2 is over 2.5 dB; the main reason is as follows: the transmitting frequency band may be from 850 MHz to1910 MHz, while the receiving frequency band may be from 1930 MHz to 1990 MHz, and so it may be very difficult to make a band-pass filter with only a center of 1950 MHz and a transition band of 20 MHz.

Such a large insertion loss may cause the following problems:

(1) Power consumption problem: under the condition of a large insertion loss, in order to have sufficient output power, the output power of the amplifier may need to be enhanced and accordingly the power consumption may be increased.

(2) Heat dissipation problem: increase of output power of the power amplifier and increase of the power consumption may result in increased heat. Heat of the power amplifier of the existing WCDMA terminal may be very large, which may affect battery and user's experience.

(3) Cost problem: cost of a device with high technical indices may be high, resulting in a high cost of a whole terminal.

SUMMARY OF THE INVENTION

In order to improve the situation, the present invention may provide a wireless communication transmitting and receiving system for solving the problem of the large insertion loss resulting from use of a duplexer from the prior art.

In order to achieve the above object, the wireless communication transmitting and receiving system implementing the present invention may comprise a wireless transmitting and receiving unit, a receiving processing circuit, a transmitting processing circuit, and a receiving aerial and a transmitting aerial. Both the receiving processing circuit and the transmitting processing circuit may be connected to the wireless transmitting and receiving unit, and the receiving aerial and the transmitting aerial may be respectively connected to the receiving processing circuit and the transmitting processing circuit.

Based on the above main features, the receiving processing circuit may include a receiving surface acoustic wave filter and a single-pole five-throw switch. The single-pole five-throw switch may be connected to the receiving aerial. The received signal may be transmitted to the single-pole five-throw switch.

According to the above main features, the transmitting processing circuit may include a transmitting surface acoustic filter, a power amplifier, a low-pass filter, a single-pole five throw switch and a broadband coupler. The transmitting surface acoustic filter may be connected to the wireless transmitting and receiving unit; then the signal may be output to the power amplifier for amplification, output to a low-pass filter for filtering, output to the single-pole five-throw switch, and finally output to the transmitting aerial via the broadband coupler.

According to the above main features, the low-pass filter, the single-pole five-throw switch and the broadband coupler are integrated together.

As compared with prior art, the present invention does not use a duplexer and accordingly provides the following advantages:

(1) Lowering the insertion loss of the system and accordingly achieve the object of saving on power consumption. (2) Lowering the maximum power of the power amplifier needed to be output and accordingly achieve the object of lowering heat dissipation of the terminal. (3) Modules at the front section such as an amplifier, etc. can be integrated together without need of a duplexer using the process of a surface acoustic filter. Meanwhile, the present invention also may use a dual-aerial structure where the transmitting channel may be separated from the receiving channel and the two channels may use respective aerials for communication; the separate aerials may provide an isolation of approximately 10 dB, thus lowering the in-band noise receiving requirement for the transmitting channel.

DETAILED DESCRIPTION OF THE INVENTION

The embodiments of the present invention will be described in connection with the drawings as follows.

Figure 1:
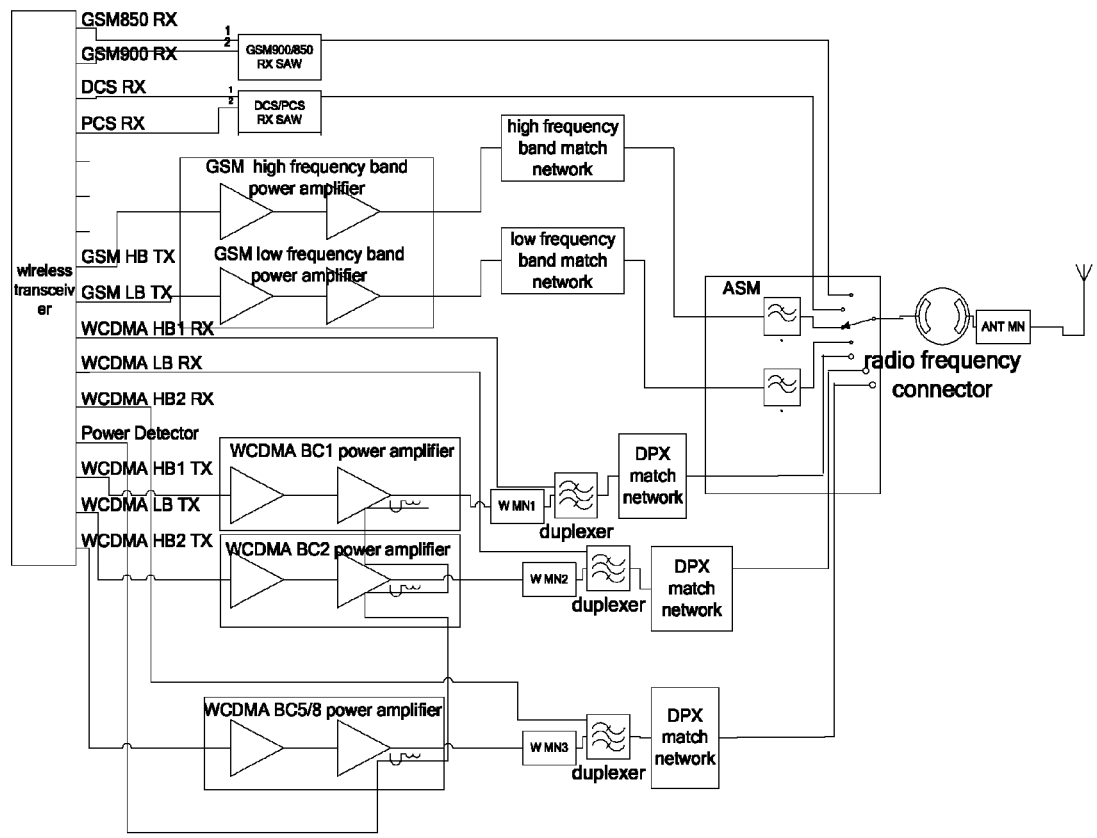
FIG. 1 is a RF structural diagram of a typical FDD mobile terminal.
Figure 2:
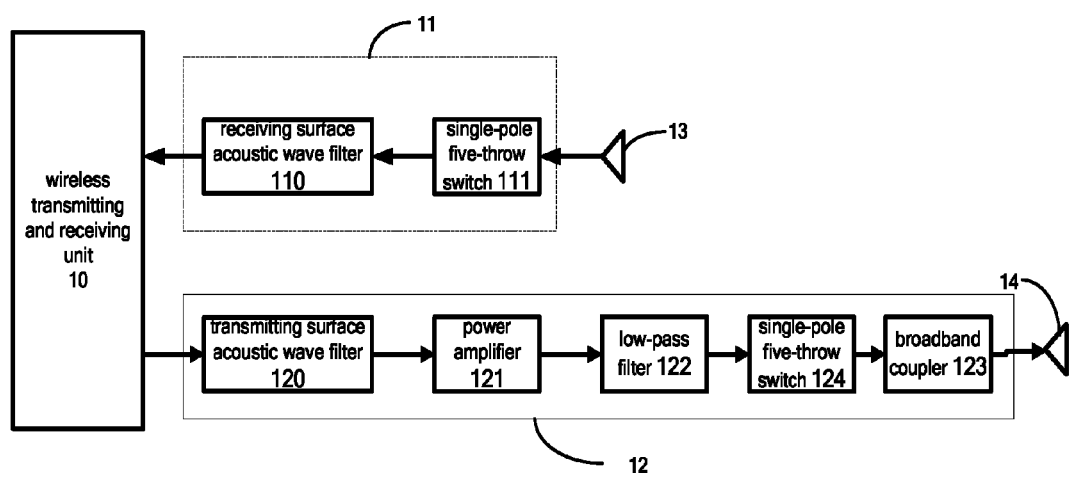
FIG. 2 is a functional architectural diagram implementing a wireless transmitting and receiving system of the present invention.

Referring to FIG. 2, it shows a functional architectural diagram of a wireless transmitting and receiving system according to an implementation of the present invention. The wireless transmitting and receiving system may comprise a wireless transmitting and receiving unit 10, a receiving processing circuit 11, a transmitting processing circuit 12, a receiving aerial 13 and a transmitting aerial 14. Both the receiving processing circuit 11 and the transmitting processing circuit 12 may be connected to the wireless transmitting and receiving unit 10, and the receiving aerial 13 and the transmitting aerial 14 may be respectively connected to the receiving processing circuit 11 and the transmitting processing circuit 12.

Figure 3:
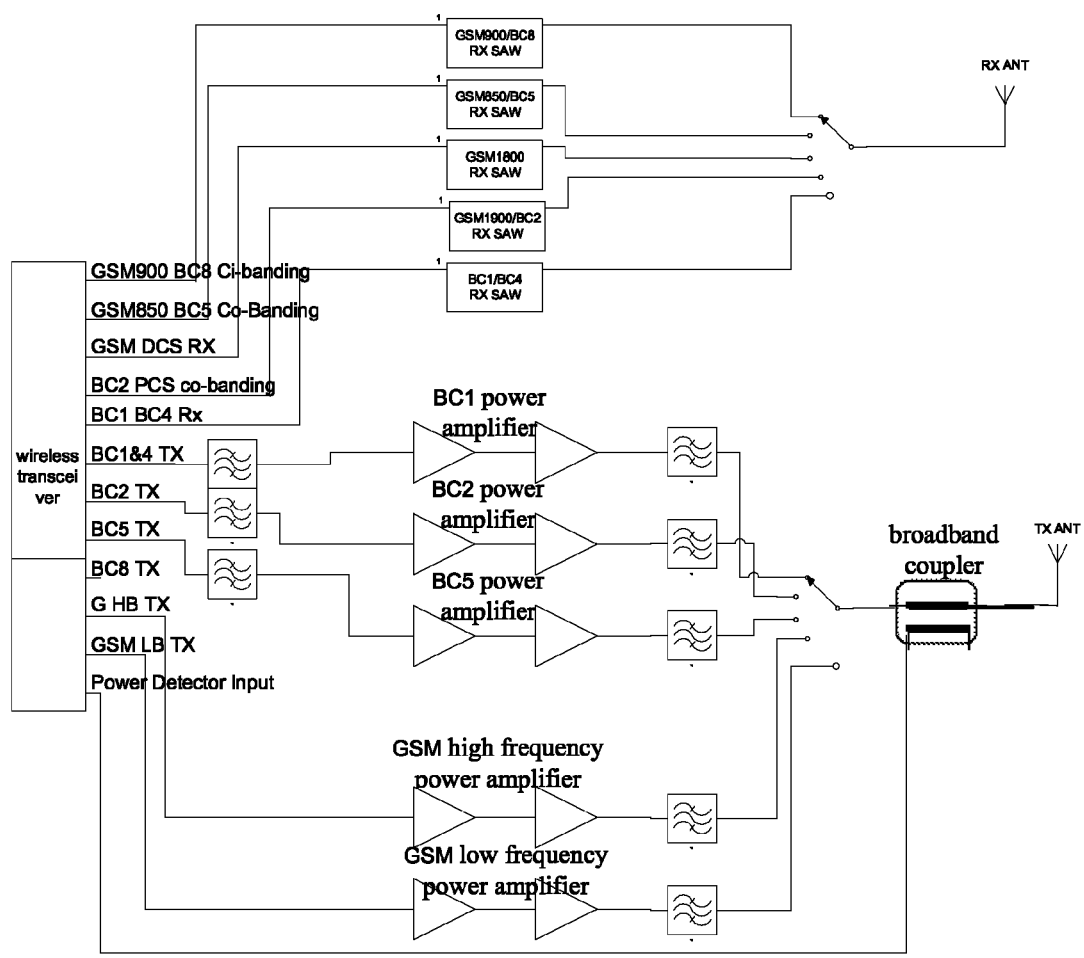
FIG. 3 is an architectural diagram of discrete devices implementing a wireless communication transmitting and receiving system of the present invention.

Referring to FIG. 3, it shows an architectural diagram of discrete devices implementing a wireless communication transmitting and receiving system of the present invention. The receiving processing circuit 11 may comprise a receiving surface acoustic filter 110 and a single-pole five-throw switch 111. The single-pole five-throw switch 111 may be connected to a receiving aerial 13 and the received signal may be transmitted to the single-pole five-throw switch 111. A plurality of receiving surface acoustic filters 110 may be provided, which may correspond to different receiving frequency bands. Signals received from the receiving aerial 13 may be transmitted to different receiving surface acoustic filters 110 according to the settings of the system. Signals output from the receiving surface acoustic filters 110 may be transmitted to the wireless transmitting and receiving unit for processing.

The transmitting processing circuit 12 may comprise a transmitting surface acoustic filter 120, a power amplifier 121, a low-pass filter 122, a broadband coupler 123 and a single-pole five-throw switch 124. The transmitting surface acoustic filter 120 may be connected to the wireless transmitting and receiving unit 10; then the signal may be output to the power amplifier 121 for amplification, output to a low-pass filter 122 for filtering, output to the single-pole five-throw switch 124, and finally output to the transmitting aerial 14 via the broadband coupler 123.

The operation frequency band of the wireless transmitting and receiving unit may comprise 900 MHz, 850 MHz, 1800 MHz and 1900 MHz of a global system for mobile communications (GSM) and 2100 MHz of a universal mobile telecommunications system (UMTS).

In addition, main parameter indicators of each device in FIG. 3 may be as follows:

For the wireless transmitting and receiving unit 10: its maximum output power may be 7 dBm; the minimum output power may be −76 dBm; noise at the receiving frequency band may be: −140 dBm/Hz.

For the transmitting surface acoustic filter: its insertion loss may be 2 dB and attenuation of the receiving frequency band may be 30 dB.

For the power amplifier: the amplification gain at a high frequency band of the transmitting frequency band may be 23 dB, and the amplification gain at a low frequency band of the transmitting frequency band may be 22 dB. The high frequency receiving in-band amplification gain may be 9 dB, and the low frequency receiving in-band amplification gain may be 8 dB. The attenuation of gain from the transmitting frequency band to the receiving frequency band may be 14 dB, the total output noise of the receiving frequency band at a high frequency may be −161 dBm/Hz, and the total output noise of the receiving frequency band at a low frequency may be −162 dBm/Hz.

For the low-pass filter, the insertion loss at a high frequency may be 0.8 dB, and at a low frequency may be 0.5 dB. Harmonic wave suppression may be 25 dB. The output noise of the receiving frequency band at a high frequency may be −161.8 dBm/Hz, and at a low frequency may be −162.5 dBm/Hz.

For the single-pole five-throw switch, the insertion loss at a high frequency may be 0.8 dB, and at a low frequency may be 0.5 dB. The output noise of the receiving frequency band at a high frequency band may be −162.6 dBm/Hz and at a low frequency band may be −163 dBm/Hz.

The insertion loss of the broadband coupler may be 0.3 dB.

The insertion loss of the RF transmission line at a high frequency may be 0.6 dB and at a low frequency may be 0.2 dB. Noise of the output of the receiving frequency band at a high frequency may be −163.5 dBm/Hz and at a low frequency may be −163.5dBm/Hz.

By means of the above arrangements in structure and corresponding parameter configurations, that is, by the separation of the transmitting aerial and the receiving aerial, the level of noise from the transmitting channel falling into the receiving terminal may be −173.5 dBm/Hz, thereby meeting the receiving performance requirement of the whole system.

Moreover, technical indicators of the above various devices may not need to be implemented by selecting special modules. For the wireless transceiver, prior wireless transceivers may implement the technical indicators. A typical application is the wireless transceiver of a Qualcomm platform such as RTR8600, 8615 and others, which can all achieve the above technical indicators.

The technical indicators of the transmitting surface acoustic filter can also be implemented by prior devices. For example, Murata, EPCOS and other manufacturers may all provide products in batch for implementing the above indicators.

The technical indicators of the transmitting power amplifier can be implemented by products of PA manufacturers with CMOS technology (e.g. Javelin). CMOS technology can integrate inductances and capacitors into a power amplifier to filter the receiving frequency band, thereby achieving the effect.

The isolation of the dual-aerial can also be implemented. Products of existing aerial suppliers such as Skycross and ethertronics can implement the indicators.

In addition, in actual implementation, the low-pass filter, the single-pole five-throw switch and the broadband coupler in FIG. 3 can all be integrated into one chip. Accordingly, on the one hand, space can be saved, and on the other hand, the length of the RF transmission line can be saved to have the path between the output of the amplifier and the transmitting aerial as short as possible for further lowering the insertion loss.

The above architecture may present a solution of 3 frequency bands of WCDMA. If addition of a frequency band such as the one supported by 4G channel or other 3G FDDs is required, it may only need to add or reduce the number of ports of aerial switches. The configuration of each transmitting channel may almost be the same. The specific operation principle thereof may not be described in detail herein.

As compared with prior art, the RF architecture of the FDD terminal provided by the present invention may not use a duplexer, and so may provide the following advantages: (1) lowering the insertion loss of the system and accordingly achieve the purpose of saving power consumption; (2) lowering the maximum power of the power amplifier needed to be output and accordingly achieving the purpose of lowering heat dissipation of the terminal; (3) modules at the front section such as an amplifier, etc. can be integrated together without need of a duplexer using the process of a surface acoustic filter.

And, the present invention may use a dual-aerial structure in which a transmitting channel is separated from a receiving channel and the two channels may use respective aerials for communication; the separate aerials may provide an isolation of approximately 10 dB, thus lowering the in-band noise receiving requirement for the transmitting channel.

It can be understood that those skilled in the art may make equivalent substitutions or modifications based on the technical solution of the present invention and based on the concept of the invention, while all of the substitutions or modifications belong within the protective scope of the appended claims.

I claim:

1. A wireless communication transmitting and receiving system, comprising:
    a wireless transmitting and receiving unit, a receiving processing circuit, a transmitting processing circuit, a receiving aerial and a transmitting aerial, wherein both the receiving processing circuit and the transmitting processing circuit are connected to the wireless transmitting and receiving unit, and wherein the receiving aerial and the transmitting aerial are separated by at least 10 dB;
    the receiving aerial is connected to the receiving processing circuit;
    the transmitting aerial is connected to the transmitting processing circuit;
    the receiving processing circuit comprises a receiving surface acoustic filter and a receiver single-pole five-throw switch, wherein the receiver single-pole five-throw switch is connected to the receiving aerial, and a received signal is transmitted to the receiver single-pole five-throw switch;
    the transmitting processing circuit comprises a transmitting surface acoustic filter, a power amplifier, a low-pass filter, a transmitter single-pole five-throw switch and a broadband coupler, wherein the transmitting surface acoustic filter is connected to the wireless transmitting and receiving unit, and wherein an insertion loss of the transmitting surface acoustic filter is less than 2 dB, a signal is output to the power amplifier for amplification, the signal is output to the low-pass filter for filtering, the signal is output to the transmitter single-pole five-throw switch, and the signal is output to the transmitting aerial via the broadband coupler.

2. The wireless communication transmitting and receiving system of claim 1, wherein the low-pass filter, the transmitter single-pole five-throw switch and the broadband coupler are integrated into a whole.

3. The wireless communication transmitting and receiving system of claim 2, wherein the low-pass filter, the transmitter single-pole five-throw switch and the broadband coupler are integrated into one chip.

4. The wireless communication transmitting and receiving system of claim 1, wherein the receiving surface acoustic filter comprises a plurality of receiving surface acoustic filters corresponding to different receiving frequency bands.

5. The wireless communication transmitting and receiving system of claim 1, wherein an insertion loss of the transmitter single-pole five-throw switch at a high frequency is 0.8 dB and an insertion loss of the single-pole five-throw switch at a low frequency is 0.5 dB.

6. The wireless communication transmitting and receiving system of claim 1, wherein the wireless transmitting and receiving unit utilizes the frequencies of 850 MHz, 900 MHz, 1800 MHz, 1900 MHz, and 2100 MHz.

7. The wireless communication transmitting and receiving system of claim 1, wherein for the transmitting surface acoustic filter, an insertion loss is 2 dB.

8. The wireless communication transmitting and receiving system of claim 1, wherein for the power amplifier, an amplification gain of a transmitting frequency is 23 dB.

9. A wireless communication transmitting and receiving system, comprising:
    a wireless transmitting and receiving unit, a receiving processing circuit, a transmitting processing circuit, a receiving aerial and a transmitting aerial, wherein both the receiving processing circuit and the transmitting processing circuit are connected to the wireless transmitting and receiving unit, and wherein a maximum output power of the wireless transmitting and receiving unit is 7 dB;
    the receiving aerial is connected to the receiving processing circuit;
    the transmitting aerial is connected to the transmitting processing circuit;
    the receiving processing circuit comprises a receiving surface acoustic filter and a receiver single-pole five-throw switch, wherein the receiver single-pole five-throw switch is connected to the receiving aerial, and a received signal is transmitted to the receiver single-pole five-throw switch.

10. The wireless communication transmitting and receiving system of claim 9, wherein a low-pass filter, a transmitter single-pole five-throw switch and the broadband coupler are integrated into a whole.

11. The wireless communication transmitting and receiving system of claim 10, wherein the low-pass filter, the transmitter single-pole five-throw switch and the broadband coupler are integrated into one chip.

12. The wireless communication transmitting and receiving system of claim 10, wherein an insertion loss of the transmitter single-pole five-throw switch at a high frequency is 0.8 dB and an insertion loss of the single-pole five-throw switch at a low frequency is 0.5 dB.

13. The wireless communication transmitting and receiving system of claim 9, wherein the receiving surface acoustic filter of the system comprises a plurality of receiving surface acoustic filters corresponding to different receiving frequency bands.

14. The wireless communication transmitting and receiving system of claim 9, wherein the wireless transmitting and receiving unit utilizes the frequencies of 850 MHz, 900 MHz, 1800 MHz, 1900 MHz, and 2100 MHz.

15. A wireless communication transmitting and receiving system, comprising:
   a wireless transmitting and receiving unit, a receiving processing circuit, a transmitting processing circuit, a receiving aerial and a transmitting aerial, the receiving processing circuit comprises a plurality of receiving surface acoustic filters corresponding to different receiving frequency bands, wherein both the receiving processing circuit and the transmitting processing circuit are connected to the wireless transmitting and receiving unit, and wherein a minimum output power of the wireless transmitting and receiving unit is −76 dB; and
   the receiving aerial is connected to the receiving processing circuit; and the transmitting aerial is connected to the transmitting processing circuit,
   wherein a low-pass filter, a single-pole five-throw switch and a broadband coupler are integrated into a whole.

16. The wireless communication transmitting and receiving system of claim 15, wherein the low-pass filter, the single-pole five-throw switch and the broadband coupler are integrated into one chip.

17. The wireless communication transmitting and receiving system of claim 15, wherein an insertion loss of the single-pole five-throw switch at a high frequency is 0.8 dB and an insertion loss of the single-pole five-throw switch at a low frequency is 0.5 dB.

18. The wireless communication transmitting and receiving system of claim 15, wherein the wireless transmitting and receiving unit utilizes the frequencies of 850 MHz, 900 MHz, 1800 MHz, 1900 MHz and 2100 MHz.

* * * * *